United States Patent [19]
Bestenreiner et al.
[11] 3,780,214
[45] Dec. 18, 1973

[54] METHOD AND APPARATUS FOR MAKING COLOR PRINTS ON PAPER

[75] Inventors: Friedrich Bestenreiner, Grunwald; Josef Helmberger, Munich; Rudolf Müller, Deisenhofen; Walter Simm, Leverkusen, all of Germany

[73] Assignee: Agfa-Gevaert Aktiengesellschaft, Leverkusen, Germany

[22] Filed: Aug. 16, 1971

[21] Appl. No.: 172,158

[30] Foreign Application Priority Data

Aug. 17, 1970 Germany .................. P 20 40 665.9

[52] U.S. Cl. ........ 178/5.2 R, 346/76 L, 178/5.4 CD
[51] Int. Cl. ............................................ H04n 9/02
[58] Field of Search .................... 346/76 L; 178/5.2, 178/5.4, 5.4 CD; 355/4, 43

[56] References Cited

UNITED STATES PATENTS

| | | | |
|---|---|---|---|
| 3,573,847 | 4/1971 | Sacerdotl | 346/76 L |
| 3,574,456 | 4/1971 | Grace | 355/4 |
| 3,181,170 | 4/1965 | Akin | 346/76 L |
| 3,351,948 | 11/1967 | Bonn | 346/76 L |
| 3,563,647 | 2/1971 | Kittredge | 355/43 |
| 3,570,380 | 3/1971 | Kamenstein | 346/76 L |
| 3,583,807 | 6/1971 | Pollock | 355/4 |
| 3,601,484 | 8/1971 | Dybvig et al | 355/4 |
| 3,404,221 | 10/1968 | Loughren | 178/5.2 R |

*Primary Examiner*—Richard Murray
*Attorney*—Michael S. Striker

[57] ABSTRACT

Color prints of multicolored originals are obtained on absorbent paper by exposing recording layers each of which consists of a differently pigmented material to the action of electrooptically regulated laser beams so that the thermal images formed by the beams are representative of correspondingly colored portions of the original. The thermal images are applied to a strip of paper so that the differently colored images of the same original overlie each other. The recording layers can be provided on the paper strip or on discrete expendable or reusable flexible carriers which are transported across the paths of the respective laser beams. Such beams are produced by a 10.6$\mu$–$CO_2$ laser which emits a main beam and by partly and fully reflective mirrors which are placed into the path of the main laser beam. The recording layers may consist of liquid, pasty or pulverulent material.

34 Claims, 8 Drawing Figures

INVENTORS
FRIEDRICH BESTENREINER
BY JOSEF HELMBERGER
RUDOLF MÜLLER
WALTER SIMM

INVENTORS
FRIEDRICH BESTENREINER
BY JOSEF HELMBERGER
RUDOLF MÜLLER
WALTER SIMM

INVENTORS

FRIEDRICH BESTENREINER
BY JOSEF HELMBERGER
RUDOLF MÜLLER
WALTER SIMM

INVENTORS

BY FRIEDRICH BESTENREINER
JOSEF HELMBERGER
RUDOLF MÜLLER
WALTER SIMM

METHOD AND APPARATUS FOR MAKING COLOR PRINTS ON PAPER

BACKGROUND OF THE INVENTION

The present invention relates to a method and apparatus for producing color prints on paper, and more particularly for producing colored replicas of multicolored orginals which are scanned, point-by-point or line-by-line, by electrooptical means so that the latter produce several sets of signals each of which can be used to regulate a discrete light beam in accordance with the distribution of a different color in the original.

At the present time, color prints (especially of amateur-exposed film frames) are made by resorting to a relatively expensive, time-consuming and complicated wet treatment of costly printing material, normally a strip or sheet of paper which is coated with a layer of photosensitive silver-containing composition. Such procedure is not suited for the making of satisfactory prints after prolonged storage of photosensitive paper stock.

It was already proposed to produce color prints by resorting to an electrophotographic method and by employing a paper strip coated with a mixture of ZnO granules which are sensitized for different colors. The Zno granules are normally of a whitish grey color, and it was found that such granules cannot be made to contain requisite quantities of pigments which would suffice for the satisfactory reproduction of deep or intensive colors in the original. The admission of excessive quantities of pigments affects the photoconductive characteristics of the ZnO carrier to such an extent that the carrier is not suited for the practice of the electrophotographic method.

It is also known to scan each and every spot of a multicolored original by a suitable scanner for the purpose of direct production of positive images of data or other information on the original. The scanning of each spot on the original is desirable in order to insure more satisfactory reproduction of the different colors in each part of the image. The original is scanned by a first light beam and the scanner influences a second light beam (which moves in synchronism with the first beam) through the intermediary of electronic transducer means. The second light beam is caused to impinge on a photosensitive layer which is applied to paper or another suitable print material.

The two last discussed prior proposals also share the drawback of high cost for the necessary equipment and for the material on which the color prints are to be made.

SUMMARY OF THE INVENTION

An object of the invention is to provide a novel and improved method of making color prints on a relatively inexpensive material, such as untreated (non-sensitized) paper sheets, strips or the like, and of making color prints which contain the reproductions of any desired number of colors which appear in a multicolored original.

Another object of the invention is to provide a method which can be employed for making color prints of multicolored originals on paper strips which need not be subjected to any wet treatment and can be subdivided to yield discrete prints immediately after the exposure to means which transfers thereto the images of multicolored originals.

A further object of the invention is to provide a method according to which a highly satisfactory colored image of a multicolored original can be produced directly on a paper strip or the like or is formed in several colors prior to transfer onto the paper strip.

An additional object of the invention is to provide a novel apparatus which can be utilized for carrying out the above outlined improved method.

The method of the present invention is resorted to for the making of color prints on paper, particularly on a strip of untreated absorbent paper. The method comprises the steps of optically scanning a multicolored original and producing at least two sets of signals representative of the distribution of at least two different colors in a substantial number of minute regions (preferably in each spot) of the original, utilizing the thus obtained sets of signals to regulate the intensity of at least two discrete laser beams so that the intensity of such beams varies as a function of changes in the distribution of the respective colors in the original, training each such intensity-regulated laser beam upon a substantial number of minute regions (preferably on all spots) of a discrete recording layer containing a pigment in the respective color to transmit to the respective layer radiant energy which is contained in the respective laser beam and to thereby heat at least some portions of the layer to a temperature which at least equals the melting point of the layer and to thus produce on the recording layer a thermal image of the original in the respective color, and contacting the layers with a portion of a paper strip to thereby transfer the thermal images onto such portion of the paper strip so that the transferred images overlie each other. The contacting step can take place simultaneously with or following the image producing step. In the first instance, the recording layers can be provided directly on the paper strip. In each instance, the recording layers may be applied to discrete flexible carriers which are thereupon caused to contact the paper strip to transfer the thermal images onto the paper strip.

The minute regions of the original and of the recording layer preferably constitute discrete points and the number of the sets of signals, of the laser beams and of the recording layers may be selected practically at will, e.g., two, three, four or six. The thermal images which are produced on the recording layers may comprise portions which are formed as a result of evaporation of the respective recording layer, as a result of one or more chemical changes and/or as a result of sublimation in response to exposure to the respective laser beam. If the laser beams cause evaporation of or chemical changes in certain portions of the respective recording layers, the remaining portions of the recording layers are preferably fused so that they can be readily absorbed by the paper strip. If the laser beams cause melting of certain portions of the respective recording layers, such layers can be brought immediately into contact with the paper strip, for example, while they are exposed to the respective laser beams and while selected portions of the thermal images are still in a molten state.

Each of the recording layers can be applied to one side of a sheet-like laser light-transmitting carrier which is moved across the path of the respective laser beam so that the beam impinges upon the other side of the carrier to thereby permit the conversion of the respective recording layer into a thermal image. The carriers for the recording layers preferably exhibit poor heat-absorbing characteristics and the contacting step between the thermal images and the paper strip can take place at least substantially simultaneously with the formation of thermal images. The laser beams can cause a fusing, sublimation or chemical changes in the recording layers to thereby produce thermal images which are transferred onto the paper strip.

Each recording layer may consist of a fusible toner which is preferably in a pulverulent state and portions of which are fused on exposure to the respective laser beam. The layers of toner can be applied to expendable or reusable sheet-like or endless band-like carriers or directly to the paper strip. The means for producing the laser beams is preferably a $10.6\mu$–$CO_2$ laser which is electrooptically regulated by GaAs (gallium arsenide) crystals.

The novel features which are considered as chracteristic for the invention are set forth in particular in the appended claims. The improved print making apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
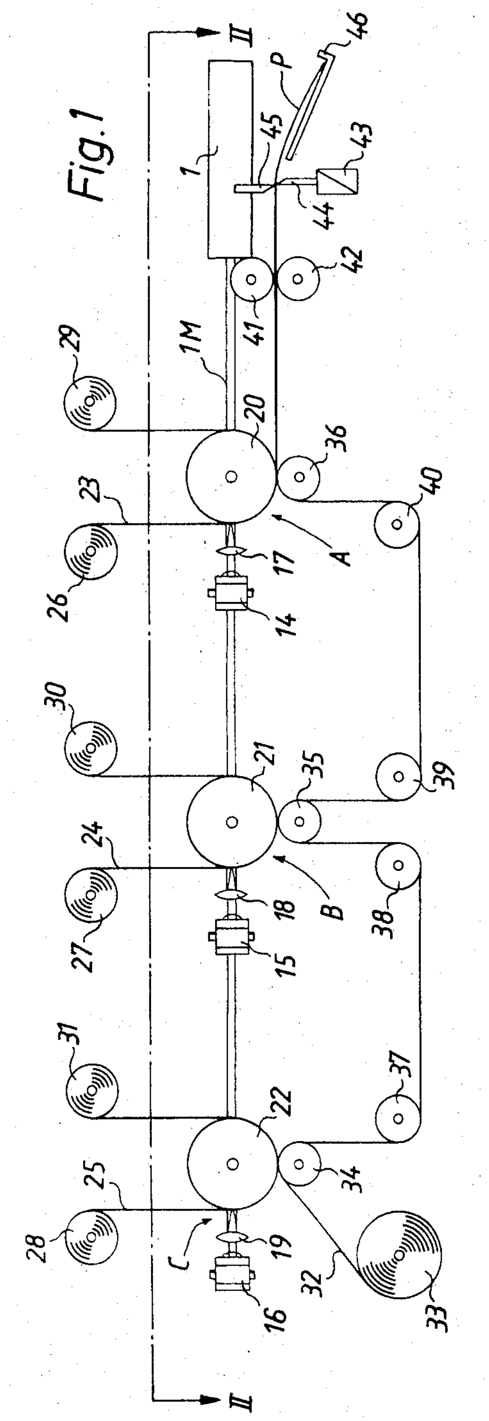
FIG. 1 is a diagrammatic side elevational view of an apparatus which can be utilized for the making of paper prints in three colors.
Figure 2:
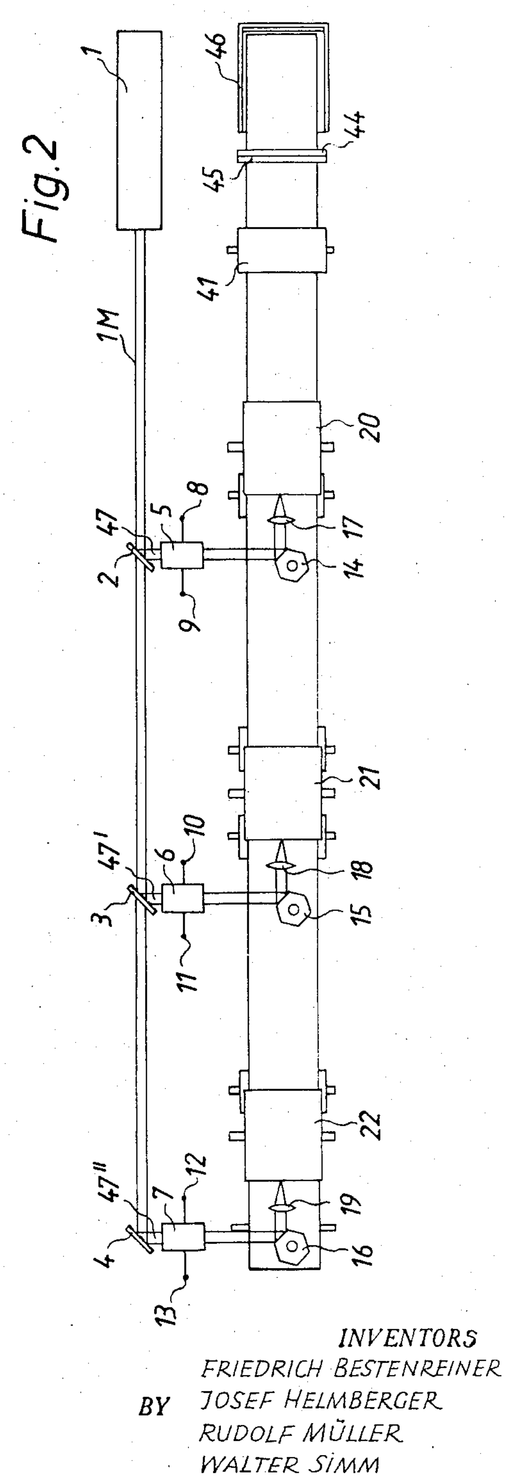
FIG. 2 is a diagrammatic plan view substantially as seen in the direction of arrows from the line II—II of FIG. 1.

FIGS. 1 and 2 illustrate an apparatus which is utilized for the making of color prints on a strip 32 of paper which is being withdrawn from a roll 33 containing a supply of convoluted paper stock. The apparatus comprises a $10.6\mu$–$CO_2$-laser 1 which emits a main beam 1M of light against a series of spaced mirrors 2, 3 and 4. The mirrors 2 and 3 are of partly light-transmitting type and the mirror 4 reflects 100 percent of incoming light. The reflectivity of the mirror 2 is 33⅓percent, and the reflectivity of the mirror 3 is 50 percent. In this way, the beam 1M which is emitted by the laser 1 is divided substantially uniformly and is directed to three discrete printing stations A, B, C one of which is designed to make red prints, another of which makes blue prints, and the last of which makes green prints. The stations A, B, C respectively include known electrooptical regulating or control systems 5, 6, 7 for the laser beams 47, 47′, 47″ and these control systems respectively include terminals or clamps 8–9, 10– 11, 12–13 for reception of signals from an electrooptical scanning system (not shown) which scans the multicolored original (not shown) and transmits to the control systems 5, 6, 7 appropriate sets of signals for the control of laser beams 47, 47′, 47″.

The stations A, B, C further accommodate mirrored wheels or drums 14, 15, 16 which deflect the respective laser beams 47, 47′, 47″ in synchronism with the scanning movements of the light beam in the aforementioned electrooptical scanning system for the multicolored original.

The laser beams 47, 47′, 47″ are moved line by line and are focussed on the surfaces of drums 20, 21, 22 by lenses 17, 18, 19 consisting of gallium arsenide (GaAs). A flexible expendable carrier 23 for a red recording layer is draped partially around the drum 20, a flexible carrier 24 for a blue recording layer is draped partially around the drum 21, and a flexible carrier 25 for a green recording layer is partially draped around the drum 22. Each of the carriers 23–25 is a thin plastic foil which is coated with a layer of colored fusible recording matter of known composition. Such matter normally contains a wax-like binder for pigments in the respective colors. The carriers 23–25 are stored on supply reels 26, 27, 28 and are collected by takeup reels 29, 30, 31. The parts 26, 20, 29 constitute a conveyor which draws the carrier 23 (stored in convoluted form on the reel 26) across the path of the laser beam 47 and convolutes the carrier 23 on the reel 29. The parts 27, 21, 30 and 28, 22, 31 constitute analogous conveyors for the carriers 24 and 25.

The thermal images which are formed by the laser beams 47, 47′, 47″ on the recording layers on carriers 23–25 are thereupon transferred onto the untreated paper strip 32 which is guided and conveyed by rollers 34, 35, 36, 37, 38, 39, 40 so that it contacts the recording layers on the carriers 25, 24, 23 in the regions of the drums 22, 21, 20. The rollers 34, 35, 36 respectively press the paper strip 32 against those portions of the carriers 25, 24, 23 which are draped around the drums 22, 21, 21. The means for moving the paper strip 32 lengthwise along the path defined by the rollers 34–40 comprises two advancing rolls 41, 42 at least one of which is driven. The strip 32 thereupon passes between the knives 44, 45 of a cutting or severing device which severs the strip at regular intervals to convert it into discrete color prints P which are deposited on a table 46 or an analogous support. The knife 44 is movable by an electromagnet 43.

The laser beams 47–47″ melt portions of the recording layers on the carriers 23, 24, 25 and the molten material is transferred onto the strip 32 in such a way that the red, blue and green images of the same original are caused to overlap. The exact manner in which the movements of rollers, rolls, drums, knives and other mobile parts of the apparatus shown in FIGS. 1 and 2 are synchronized forms no part of the present invention.

The three-color printing apparatus of FIGS. 1 and 2 can be readily converted into a two-, four- or six-color printer.

The recording layers on the carriers 23, 24, 25 need not exhibit any photoconducting characteristics. Their material should be fusible or capable of sublimation so that the laser beams 47, 47', 47'' can form thereon thermal images in the respective colors of the multicolored original. Moreover, the material of the recording layers (which are shown in each of FIGS. 3–8) must be such that, when fused, it properly adheres to the paper strip 32 even if the latter is untreated. A large number of deep (intensive) and light-resistant pigments which can be incorporated into binders (especially on wax basis) is available on the market.

It was found that the improved apparatus will produce highly satisfactory color prints P in spite of the fact that each of the carriers 23, 24, 25 is normally provided with a homogeneous recording layer. The thermal images which are formed by the laser beams 47, 47', 47'' are true and accurate reproductions of the distribution of respective colors in the original, even of all half tones and even though the original need not be provided with gratings of the type knwon from the art of holograms. This is attributed to the fact that a laser beam which is concentrated upon a minute spot exhibits an intensity profile which decreases toward the marginal portions of the spot. As a function of the threshold value of the melting point of the fusible recording layer, the spots of such layer are fused by the respective laser beam in dependency on the intensity of the radiant energy transmitted by the beam in such a way that the area of each spot which is exposed to and fused by the laser beam extends through a different distance from its centrum, depending on the intensity of the beam.

If the original is scanned line-by-line with a linear laser beam, there develops an autotypographic linear grating or raster. By resorting to a pulsating laser, one can produce autotypographic points of any desired degree of fineness.

The laser 1 is preferably a 10.6$\mu$–$CO_2$ laser and its beams are preferably electrooptically controlled by GaAs crystals. Such $CO_2$ lasers with a constant-line output of 100–1,000 watts are available on the market. Experiments have shown that a maximum output of 100 watts suffices for the making of color prints in sizes of up to 13 × 18 centimeters, i.e., such color prints can be made by resorting to a commercially obtainable $CO_2$ laser. Due to the threshold values which must be considered in connection with fusible recording layers, only a fraction of the output of the laser is used for the making of thermal images. This can be achieved by resorting to a GaAs analysator which is commercially available with a constant output of 200 watts for the passing portion of the laser beam and a constant output of 20 watts for the absorbed portion of the beam. As shown in FIGS. 1 and 2, the main beam 1M can be broken up into several beams and a discrete GaAs analysator can be employed for each of the discrete laser beams 47, 47', 47''. The mirrors 2, 3, 4 extend across the main beam 1M and their transmissivity decreases proportionally with increasing distance from the laser 1.

It is clear, however, that the apparatus of FIGS. 1 and 2 can be modified by employing a discrete $CO_2$ laser (or another suitable laser) for each of the stations A, B and C. The construction of FIGS. 1 and 2 with a single laser 1 is preferred at this time because it is just as effective as but less expensive than a multi-laser apparatus.

Figure 3:
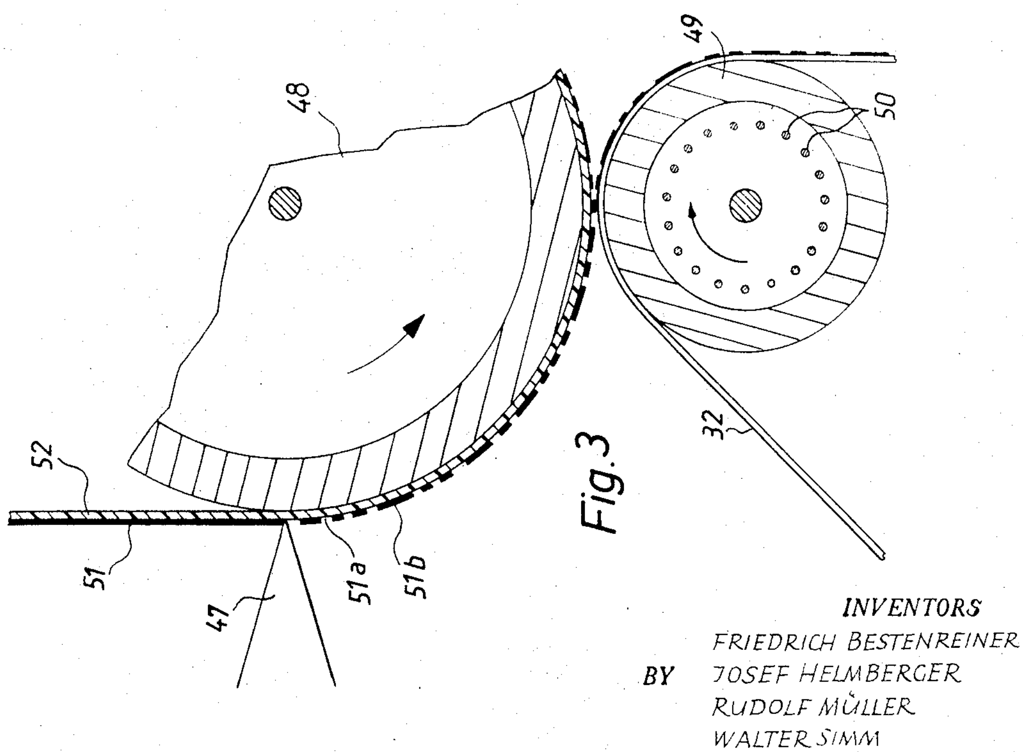
FIG. 3 is a fragmentary longitudinal vertical sectional view of a second apparatus which is provided with means for heating the paper strip during transfer of thermal images to one of its sides.

FIG. 3 illustrates a portion of a modified printing apparatus, and more particularly that portion which can be used as a substitute for the drum 20, 21 or 22 and roller 36, 35 or 34. The roller 49 is provided with internal heating means 50 (e.g., an electric resistance heater) and the flexible sheet-like carrier or foil 52 which is partially draped around the drum 48 carries an external fusible recording layer or coat 51 of pigment embedded in a wax-like binder. The laser beam which is furnished by the mirrored drum 14, 15 or 16 (not shown) is indicated at 47; the intensity of this beam varies as a function of signals furnished by the respective electrooptical scanning system. Those spots or portions of the recording layer 51 which are exposed to the full laser beam 47 are indicated at 51*a* and the portions which are not influenced by the laser beam or are influenced less are indicated by 51*b*. At the portions 51*a*, the layer 51 undergoes a chemical or other change, e.g., the wax-like binder burns away so that the recording layer is destroyed or is removed at such portions by evaporation. The portions 51*b* of the layer 51 reach the point where the roller 49 presses successive increments of the paper strip 32 against the layer 51 on the carrier or foil 52. The roller 49 is heated by the device 50 to a temperature which at least slightly exceeds the melting point of the layer 51 but is below the kindling temperature of the strip 32 so that the portions 51*b* melt and are at least partially transferred onto the strip 32. The temperature of the roller 49 is controlled by a suitable thermostat or the like, not shown. The material of the strip 32 is absorbent so that it can readily retain the molten material of the portions 51*b*. Consequently, there develops on the strip 32 a negative image of the thermal image which is formed by the laser beam 47 on the carrier 52 and includes the portions 51*a*, 51*b* of the recording layer 51. By providing suitable electronic transducer means for the laser (not shown in FIG. 3), one can form on the strip 32 a positive image in the respective color (e.g., blue, green or red). The images in the other colors are applied over the image which is formed at the station shown in FIG. 3. Thus, the apparatus which includes the parts shown in FIG. 3 may comprise two additional drums 48 for carriers or foils 52 which, however, carry recording layers 51 containing pigments other than the pigment of the layer 51 shown in FIG. 3, and rollers which are heated in the same or in a similar way as the roller 49 and cooperate with the additional drums.

Figure 4:
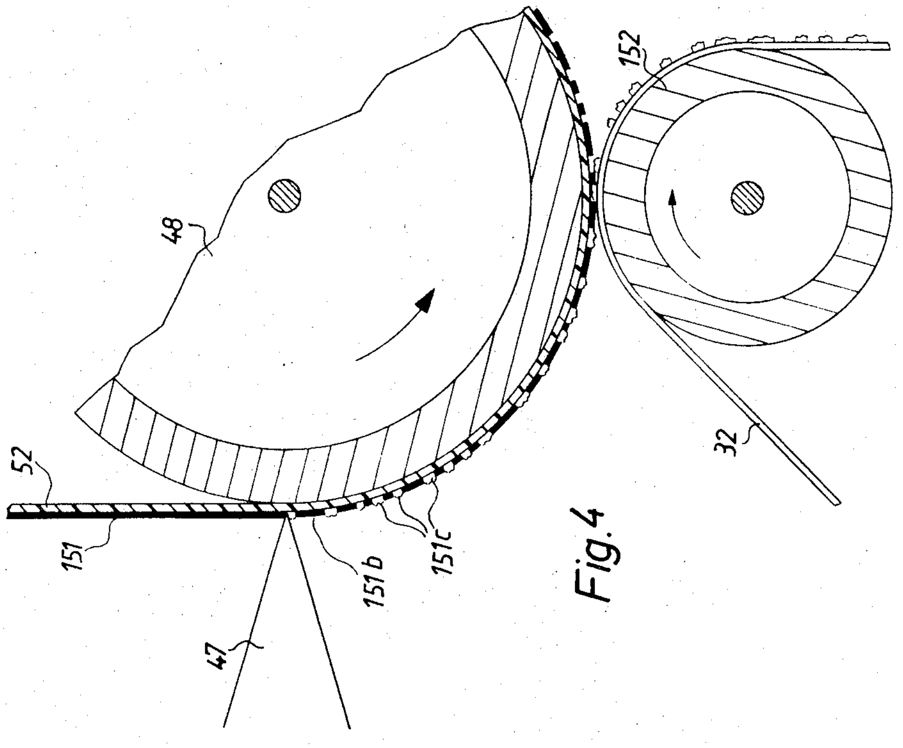
FIG. 4 is a similar fragmentary longitudinal vertical sectional view of a third apparatus wherein the transferred images consist of molten portions of recording layers.

FIG. 4 illustrates a portion of a third apparatus. The drum 48 is identical with the similarly referenced drum of FIG. 3 but the roller 49 of FIG. 3 is replaced with an unheated pressing roller 152 which presses successive increments of the paper strip 32 against the recording layer 151 on the carrier 52 which is partially draped around the drum 48. The laser beam (corresponding to the beam 1A, 1B or 1C of FIG. 2) is shown at 47. The energy of the beam 47 is selected in such a way that the unweakened beam merely effects at least partial melt ing or fusing of the corresponding portions **151*c* of the layer 151. The portions 151*b* of the layer 151 correspond to the portions 51*b* of the layer 51 shown in FIG. 3. As the parts 48, 152 rotate in the directions indicated by the arrows, the molten portions 151*c* of the layer 151 are transferred onto and absorbed by the strip 32 to form thereon, in the respective color, a positive image of the thermal image on the carrier 52. By properly controlling the laser, one can obtain on the strip 32** a positive image of the original.

An advantage of the structure shown in FIG. 4 is that the heating device for the pressing roller 49 can be omitted. It will be noted that the transfer of thermal images onto the strips shown in FIGS. 3 and 4 takes place immediately following the production of such images by the laser beams 47.

Figure 5:
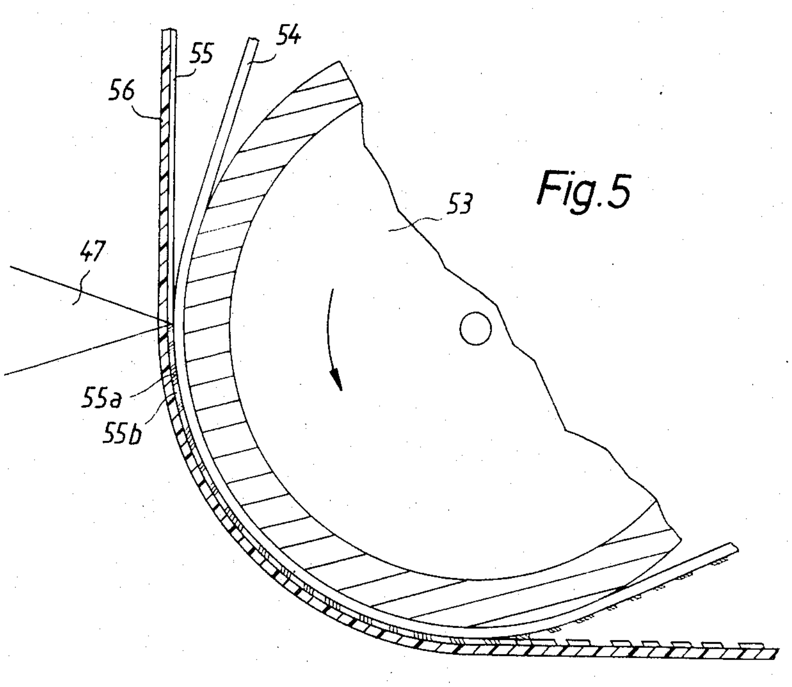
FIG. 5 is a similar fragmentary longitudinal vertical sectional view of a fifth apparatus wherein the recording layers are applied to flexible carriers with poor heat-absorbing characteristics and wherein the laser beams impinge upon the recording layers through the respective carriers.

Referring to FIG. 5, there is shown a paper strip 54 which replaces the strip 32 and is trained over a drum 53. The strip 54 is overlapped by the fusible recording layer 55 which is applied to one side of a flexible sheet-like transparent carrier 56 which transmits the laser beam 47. Those portions (**55*a*) of the recording layer 55 which are exposed to a beam of full strength are fused, sublimated or undergo a chemical change and are transferred onto the adjacent portions of the paper strip 54. The non-fused, non-sublimated or chemically unchanged portions 55*b* of the recording layer 55 continue to adhere to the carrier 56 and are not transferred onto the paper strip 54**.

It will be noted that the arrangement of FIG. 5 constitutes a substantial simplification of the arrangements shown in FIGS. 1–4 because the drum 53 serves as a means for guiding the strip 54 as well as for guiding the carrier 56 with its colored recording layer 55. The carrier 56 preferably consists of a material with poor heat-absorbing characteristics.

Figure 6:
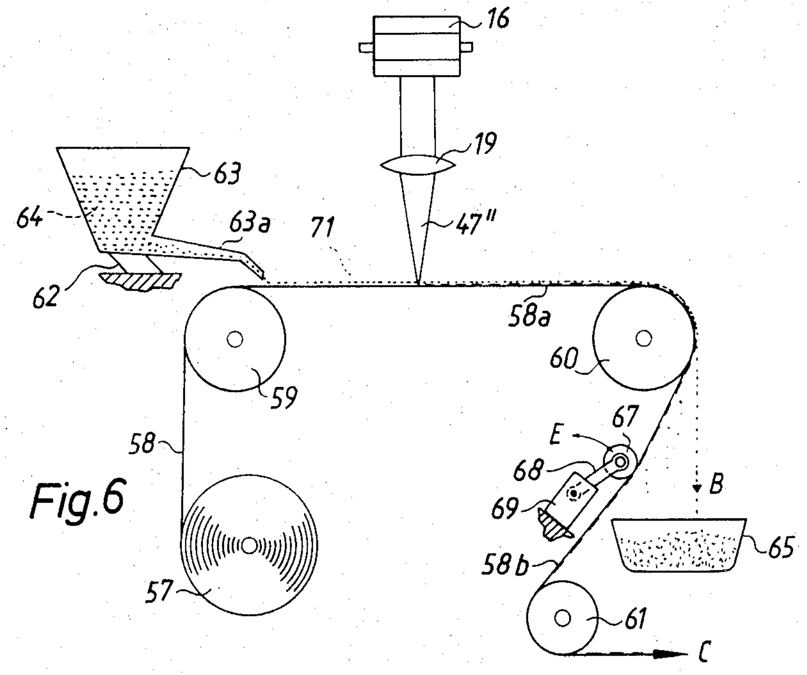
FIG. 6 is a fragmentary schematic side elevational view of a fifth apparatus wherein the recording layers are applied directly to the paper strip prior to exposure to laser beams.

FIG. 6 illustrates a portion of a fifth apparatus wherein the untreated paper strip 58 is stored in the form of a roll 57 and is guided by rollers or drums 59, 60 so that a portion **58*a* of such paper strip between these rollers advances in a substantially horizontal plane. The laser beam 47'' impinges on successive increments of such horizontal portion 58*a* of the strip 58. A magazine or hopper 63 which contains a supply of pulverulent electrofax toner 64 is mounted adjacent to the roller 59 (i.e., upstream of the point where the laser beam 47'' impinges upon the strip 58) and has an outlet 63*a* which discharges toner at a constant rate so that the thus discharged toner forms on the horizontal portion of the strip 58 a recording layer 71 of constant thickness. A magnetic vibrator 62 is preferably provided to shake the hopper 63 and to thus promote the outflow of toner 64 by way of the outlet 63*a*. The toner 64 is fusible and contains a pigment in one of two, three or more colors, depending on the number of printing stations in the apparatus which embodies the structure of FIG. 6. Those portions of the recording layer 71 which are subjected to the action of the laser beam 47 of maximum intensity are caused to melt and to be absorbed by the paper strip 58. The remainder of the recording layer 71 remains in a pulverulent state and is caused to descend by gravity in the region of the roller 60 so as to travel in the direction indicated by the arrow B and to enter a collecting or intercepting receptacle 65. The separation of unfused toner 64 from the paper strip 58 is promoted by the provision of a further guide roller or drum 61 which is mounted at a level below and to the left of the roller 60 so that the paper strip which travels over the roller 60 is deflected through an angle exceeding 90°. Thus, the portion 58*b* of the paper strip 58 immediately downstream of the roller 60 is inclined in such a way that the unfused toner 64 on its right-hand side is free to drop into the receptacle 65**.

In order to further enhance the separation of unfused toner 64 from the paper strip 58, the apparatus which embodies the structure of FIG. 6 can be provided with a knocking or shaking device including a roll 67 mounted on an arm 68 which is oscillatable back and forth in the directions indicated by the arrow E. The means for oscillating the arm 68 is indicated at 69; such means may include an eccentric, an electromagnet or the like. The roll 67 is caused to knock against the portion **58*b* of the paper strip 58 and thus promotes the separation of unfused toner 64. It was found that repeated knocking and at least limited flexing of the paper strip portion 58*b* separates therefrom the last traces of pulverulent toner 64. The thus treated paper strip 58 then advances in the direction indicated by the arrow C toward the next printing station or stations where the image formed by the laser beam 47'' is overlapped by one or more images in one or more additional colors. The structure shown in FIG. 6 corresponds to the structure at the printing station C of FIG. 1**.

Figure 7:
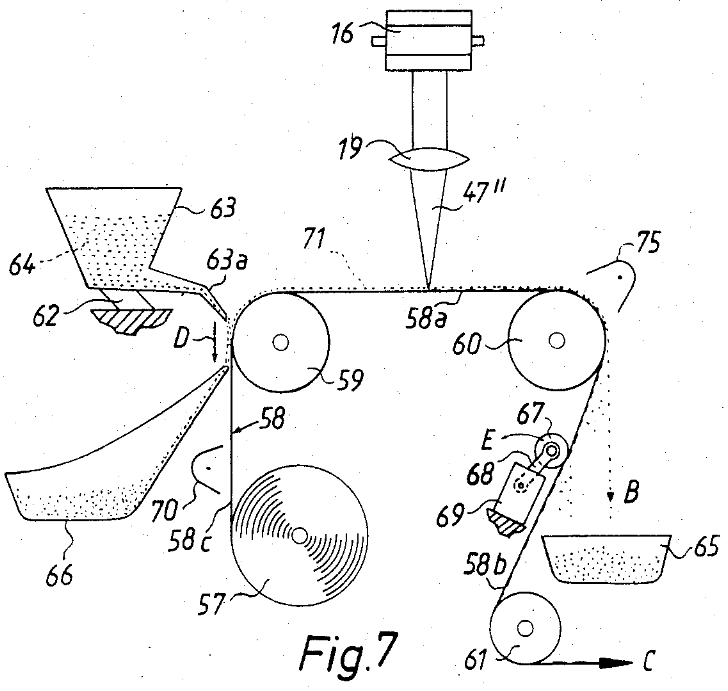
FIG. 7 is a fragmentary schematic side elevational view of an apparatus which constitutes a modification of the apparatus shown in FIG. 6.

FIG. 7 illustrates a structure which constitutes a modification of the structure shown in FIG. 6. The roll 57 which contains a supply of convoluted paper strip 58 is located substantially or exactly below the guide roller 59 so that the portion **58*c* of the strip 58 is located in a substantially vertical plane. Such protion 58*c* travels along a corona discharge device 70 which provides the paper strip 58 with an electrostatic charge, e.g., with a positive charge. Therefore, the outlet 63*a* of the receptacle 63 for a supply of pulverulent toner 64 can be placed adjacent to the portion 58*c* downstream of (i.e., above) the corona discharge device 70. The formation of the recording layer 71 consisting of particles of the toner 64 takes place in the same manner as known from the art of electrostatic printing apparatus. The surplus of toner 64 which is discharged by the outlet 63*a* and does not adhere to the charged strip 58 flows in the direction indicated by an arrow D and is collected in a receptacle 66. If desired, the toner 64 can be mixed with spherical carriers or balls. The arrangement of FIG. 7 insures the formation of a recording layer 71 whose thickness is even more uniform than that of the layer 71 shown in FIG. 6. The remaining parts of the structure shown in FIG. 7 are identical with the corresponding parts of the structure shown in FIG. 6. It is preferred to provide a second corona discharge device 75 which is adjacent to the roller 60 of FIG. 7 and serves to destroy the charge in successive increments of the paper strip 58 so that the unfused toner 64 can readily descend into the receptacle 65. The parts 67–69 constitute an optional (but desirable and advantageous) feature of the structure shown in FIG. 6 or 7**.

An advantage of the structures shown in FIGS. 6 and 7 is that the carriers for the recording layers can be dispensed with and that the positive thermal images are formed directly on an untreated paper strip.

Figure 8:
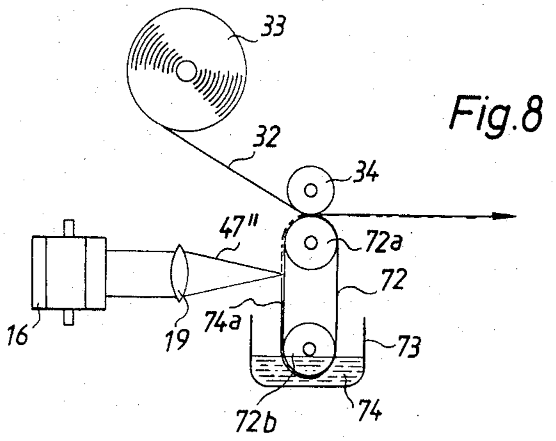
FIG. 8 is a fragmentary side elevational view of still another apparatus wherein the recording layers are applied to driven endless band-like carriers.

FIG. 8 illustrates a portion of an apparatus which constitutes a further modification of the apparatus shown in FIGS. 1 and 2. The expendable carriers or foils 23, 24, 25 of FIGS. 1 and 2 are replaced by reusable endless band-like carriers 72 (only one shown in FIG. 8) which are trained over the rollers 72*a*, 72*b* of a conveyor. The lower roller 72*b* causes a portion of the carrier 72 to dip into a supply of toner 74 in a container or receptace 73. The toner 74 is in a liquid or liquefied state. For example, the toner can be dissolved in a suitable solvent or the container 73 may be heated to maintain the toner in a molten state. The recording layer 74*a* of toner 74 which is carried upwardly by the left-hand stretch of the carrier 72 is exposed to the laser beam 47 or 47′ or 47″ (the laser beam 47″ is shown) to produce in the layer 74*a* of a thermal image which is thereupon transferred onto the paper strip 32. It will be noted that the roller 72*a* replaces the drum 20, 21 or 22 of the apparatus shown in FIGS. 1 and 2.

It is clear that, instead of causing the endless band-like carrier 72 to dip into a supply of molten or dissolved toner, the structure of FIG. 8 can embody a device which sprays dissolved or molten toner onto the left-hand stretch of the carrier 72 or by a device which is similar to the toner applying means of FIG. 6 or 7. Thus, the container 73 can be omitted and a pulverulent toner can be caused to adhere to the left-hand or to the right-hand stretch of the carrier 72 by first causing successive increments of the carrier to pass along a corona discharge device and by thereupon sprinkling pulverulent toner onto the thus charged portions of the carrier upstream of the point where the carrier 72 moves past (across the path of) the laser beam 47″.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is:

1. A method of making color prints on paper, particularly on a strip of untreated absorbent paper, comprising the steps of optically scanning a multi-colored original and producing at least two sets of signals indicating the distribution of at least two different colors in a substantial number of minute regions of said original; utilizing said signals to regulate the intensity of at least two discrete laser beams so that the intensity of said beams varies as a function of changes in the distribution of the respective colors; training each of said intensity-regulated laser beams directly upon a substantial number of minute regions of a discrete fusible recording layer containing a pigment in the respective color to transmit to the respective layer radiant energy which is contained in the respective beam and to thereby heat at least some portions of such layer to a temperature which at least equals the melting point of said recording layer and to thus produce on said layer a thermal image of said original in the respective color; and thereupon contacting said layers with a portion of a paper strip to thereby transfer said thermal images onto said portion of the strip so that the transferred images overlie each other.

2. A method as defined in claim 1, wherein said minute regions are discrete spots of said original and wherein the number of said sets of signals, of said laser beams and of said recording layers exceeds two.

3. A method as defined in claim 1, wherein at least one of said thermal images comprises portions formed as a result of evaporation of the respective recording layer in response to exposure to the respective laser beam.

4. A method as defined in claim 1, wherein at least one of said thermal images comprises portions formed as a result of a chemical change in the respective recording layer in response to exposure to the respective laser beam.

5. A method as defined in claim 1, wherein at least one of said thermal images comprises portions formed as a result of evaporation of the respective recording layer in response to exposure to the respective laser beam and the remaining portions of said one thermal image consist of fused material which is thereupon absorbed by said portion of said paper strip.

6. A method as defined in claim 1, wherein at least one of said thermal images comprises portions formed as a result of chemical changes in the respective recording layer in response to exposure to the respective laser beam and the remaining portions of said one thermal image consist of fused material which is thereupon absorbed by said portion of said paper strip.

7. A method as defined in claim 1, wherein at least one of said thermal images comprises portions formed as a result of melting of the respective recording layer and wherein said contacting step takes place immediately following the formation of said one thermal image while said portions of such image are still in a molten state.

8. A method as defined in claim 1, wherein said recording layers consist of fusible pulverulent toner portions of which are fused by the respective laser beams.

9. A method as defined in claim 8, wherein said recording layers are applied to strip-shaped carriers and wherein the fused portions of said layers adhere to such carriers prior to transfer onto said portion of said paper strip.

10. A method as defined in claim 1, wherein said beams are produced by a $10.6\mu$–$CO_2$ laser which is electrooptically regulated by GaAs crystals.

11. A method as defined in claim 1, wherein said recording layers are provided on expendable carriers which are moved past the respective laser beams.

12. A method as defined in claim 1, wherein said layers are applied to endless band-like carriers which are moved past the respective laser beams.

13. A method as defined in claim 12, wherein said layers are continuously applied to the respective carriers upstream of the points where said carriers move past the respective lasers.

14. A method as defined in claim 1, wherein said recording layers consist of toner and are applied to band-like carriers by spraying the toner onto one side of the respective carrier.

15. A method as defined in claim 14, wherein said toner contains wax.

16. A method as defined in claim 14, wherein said recording layers consist of pulverulent toner and are applied to band-like carriers, said applying step comprising electrostatically charging said carriers and thereupon sprinkling pulverulent toner in the respective color onto such carriers upstream of the respective laser beams.

17. A method of making color prints on paper, particularly on a strip of untreated absorbent paper, comprising the steps of optically scanning a multi-colored original and producing at least two sets of signals indicating the distribution of at least two different colors in a substantial number of minute regions of said original; utilizing said signals to regulate the intensity of at least two discrete laser beams so that the intensity of said beams varies as a function of changes in the distribution of the respective colors; transporting past said discrete laser beams laser light-transmitting sheet-like carriers each of which is provided at one side thereof with a fusible recording layer containing a pigment in the respective color so that each of said intensity-modulated laser beams is trained upon a substantial number of regions at the other side of the respective carrier whereby the carriers transmit said laser beams to the corresponding layers and the transmitted beams heat portions of the respective layers to a temperature which at least equals the melting points of said layers to thus produce on each of said layers a thermal image of said original in the respective color; and contacting said layers with a portion of paper strip to thereby transfer said thermal images onto said portion of the strip so that the transferred images overtie each other.

18. A method as defined in claim 17, wherein said sheet-like carrier exhibits poor heat-absorbing characteristics and wherein said contacting step takes place substantially simultaneously with the formation of said thermal images.

19. A method as defined in claim 18, wherein said thermal images include portions consisting of molten recording layers and such molten portions are absorbed by said portion of said paper strip.

20. A method as defined in claim 18, wherein said thermal images include sublimated portions of recording layers which are absorbed by said portion of said paper strip.

21. A method as defined in claim 18, wherein said thermal images include portions which have undergone chemical changes in response to exposure to the respective laser beams and are thereupon transferred onto said portion of said paper strip.

22. Apparatus for making color prints on paper, particularly on a strip of untreated absorbent paper, comprising a laser arranged to furnish at least two beams whose intensities are regulated by signals obtained by scanning the distribution of at least two different colors in a substantial number of minute regions of a multicolored original; a plurality of recording layers, one for each of said beams and each consisting of a fusible material and each containing a different pigment whose color corresponds to one of said different colors; means for effecting a relative movement between said laser means and the respective layers so that the radiant energy of said beams is transmitted directly to and heats at least some portions of said layers to a temperature which at least equals the melting point of the respective layer to thus produce on said layers thermal images of said original in the respective colors; and means for thereupon superimposing said thermal images upon each other on said paper strip to form a color print of said original.

23. Apparatus as defined in claim 22, wherein said laser is a $10.6\mu$–$CO_2$ laser and said beams are electro-optically regulated by GaAs crystals.

24. Apparatus as defined in claim 22, wherein said laser is arranged to emit a main beam and further comprising a plurality of mirrors located in the path of said main beam and disposed behind each other, at least one of said mirrors consisting of partly light transmitting material to deflect from said main beam one of said first mentioned beams and another of said mirrors being arranged to deflect from said main beam the other of said first mentioned beams.

25. Apparatus as defined in claim 24, wherein the reflectivity of said mirrors increases as a function of increasing distance from said laser.

26. Apparatus as defined in claim 22, wherein said paper strip is stored in convoluted state to form a supply and further comprising conveyor means for drawing said paper strip from said supply and for moving the strip lengthwise along the stations where said laser beams impinge upon said recording layers.

27. Apparatus as defined in claim 26, further comprising means for subdividing said strip into discrete prints downstream of said stations, each such print carrying a plurality of superimposed images in different colors.

28. Apparatus as defined in claim 22, further comprising means for heating the paper strip during transfer of said thermal images.

29. Apparatus as defined in claim 28, wherein said heating means comprises a plurality of rollers and said paper strip is trained over said rollers during transfer of said thermal images.

30. Apparatus as defined in clim 22, further comprising a discrete elongated flexible carrier for each of said recording layers, said means for effecting said relative movement comprising conveyor means for moving said carriers and the respective recording layers across the paths of the respective laser beams.

31. Apparatus as defined in claim 30, wherein said carriers are endless bands and said recording layers are applied thereto upstream of the stations where such carriers extend across the paths of the respective laser beams.

32. Apparatus as defined in claim 31, further comprising supplies of liquid toner into which said carriers dip so that the toner adheres to such carriers and forms said recording layers.

33. Apparatus as defined in claim 22, further comprising a plurality of elongated flexible carriers, one for each of said recording layers, each of said recording layers being applied to one side of the respective carrier and said means for effecting a relative movement between said laser beams and the respective layers comprising conveyor means for transporting each of said carriers from a source of supply wherein such carrier is stored in convoluted condition, across the path of the respective beam so that the beam is trained upon said one side of the respective carrier, thereupon along said paper strip to effect the transfer of the respective thermal image, and onto a rotary takeup member of said conveyor means.

34. Apparatus for making color prints on paper, particularly on a strip of untreated absorbent paper, comprising a laser arranged to furnish at least two beams whose intensities are regulated by signals obtained by scanning the distribution of at least two different colors in a substantial number of minute regions of a multicolored original; a plurality of discrete elongated laser light-transmitting flexible carriers, one for each of said beams, each of said carriers having at one side thereof a recording layer consisting of a fusible material and each of said recording layers containing a different pigment whose color corresponds to one of said different colors, each of said carriers consisting of a material having poor heat-absorbing characteristics; means for effecting a relative movement between said laser beams and the respective carriers so that the radiant energy of said beams is transmitted to the respective layers through the respective carriers and heats at least some portions of said layers to a temperature which at least equals the melting point of the respective layer to thus produce on said layers thermal images of said original in the respective colors; and means for superimposing said thermal images upon each other on said paper strip to form a color print of said original.

* * * * *